US012792470B2

(12) United States Patent
Okabe et al.

(10) Patent No.: US 12,792,470 B2
(45) Date of Patent: Nov. 10, 2026

(54) INFORMATION MANAGEMENT METHOD AND INFORMATION MANAGEMENT DEVICE

(71) Applicant: DENSO CORPORATION, Kariya-city (JP)

(72) Inventors: Tatsuya Okabe, Kariya-city (JP); Haruhiko Namiki, Kariya-city (JP); Takakazu Murakami, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 14 days.

(21) Appl. No.: 18/999,328

(22) Filed: Dec. 23, 2024

(65) Prior Publication Data

US 2025/0130901 A1 Apr. 24, 2025

Related U.S. Application Data

(63) Continuation of application No. PCT/JP2023/021171, filed on Jun. 7, 2023.

(30) Foreign Application Priority Data

Jun. 27, 2022 (JP) ................................ 2022-102989

(51) Int. Cl.
*G06F 11/14* (2026.01)
*G06F 11/1446* (2026.01)

(52) U.S. Cl.
CPC ...... *G06F 11/1458* (2013.01); *G06F 2201/80* (2013.01)

(58) Field of Classification Search
CPC .. G06F 11/1458; G06F 2201/80; G06F 11/14; G06F 11/1446; G06F 11/1448; G06F 21/64; G06Q 50/10
USPC ........................................................ 707/654
See application file for complete search history.

(56) References Cited

U.S. PATENT DOCUMENTS

| | | | | |
|---|---|---|---|---|
| 2014/0379660 | A1* | 12/2014 | Vorsprach | G06F 3/0649 707/654 |
| 2019/0180291 | A1* | 6/2019 | Schmeling | G16H 20/10 |
| 2020/0228323 | A1* | 7/2020 | Natanzon | G06F 11/1448 |
| 2021/0109917 | A1* | 4/2021 | Xiao | G06F 16/2255 |
| 2021/0234851 | A1* | 7/2021 | Kodama | H04L 63/083 |
| 2022/0122026 | A1 | 4/2022 | Okabe et al. | |
| 2022/0269809 | A1* | 8/2022 | Chopra | H04L 9/0894 |
| 2022/0398165 | A1* | 12/2022 | Bijoy | H04L 9/0894 |

FOREIGN PATENT DOCUMENTS

| | | | |
|---|---|---|---|
| JP | 2006-066997 | A | 3/2006 |
| WO | 2023181883 | A1 | 9/2023 |

* cited by examiner

*Primary Examiner* — Hicham Skhoun
(74) *Attorney, Agent, or Firm* — Precision Patents, P.C.

(57) ABSTRACT

A reporter terminal manages information collected by a supplier under a management of an administrator. In an information management method implemented by the reporter terminal, transmission data based on reporter data prepared on the supplier side is transmitted to an information record server in connection with the administrator. In addition, a backup of the transmission data is prepared, and verification information to be used to verify that the backup has not been falsified. The backup is then stored in a reporter database together with the verification information.

8 Claims, 13 Drawing Sheets

FIG. 5

ACCUMULATION DATA

| REPORTER DATA | MANAGEMENT DATA | | | |
|---|---|---|---|---|
| PRODUCT / LOT NUMBER / HISTORY INFORMATION / ETC. | FILE NUMBER | UID | ADDITIONAL DATA | HASH VALUE |
| * * * * * * * 01 | — | — | — | — |
| * * * * * * * 02 | — | — | — | — |

FIG. 6

VERIFICATION DATA

| REPORTER DATA | PATTERN | MANAGEMENT DATA (I.E., HASHING DATA)) | | | |
|---|---|---|---|---|---|
| PRODUCT / LOT NUMBER / HISTORY INFORMATION / ETC. | | FILE NUMBER | UID | ADDITIONAL DATA | HASH VALUE |
| * * * * * * *01 | 1 | b38647c312e3f43c<br>c66b7cd1b0f767a2<br>20f6ce8141a2d707<br>00c800c42afe7f4c | a8b81c868eab1bcf<br>e6a8fe5eab7ccf1f<br>64d02a29bd05ec0e<br>ec02ffb306eb2d5a | 07913fd121a8b5b4<br>40a4b19ac26eaf3e<br>be57aa90d54117bb<br>38ea6a7fda4a015a | f9240798f7f1d241<br>f1ae11803361176a<br>9daaa349c8425224<br>ab28d1aaca07e7c9 |

FIG. 12

ACCUMULATION DATA (AFTER DELETING DATA)

| REPORTER DATA | MANAGEMENT DATA | | | | INTENTION CONFIRMATION RECORD | | | |
|---|---|---|---|---|---|---|---|---|
| PRODUCT / LOT NUMBER / HISTORY INFORMATION / ETC. | FILE NUMBER | UID | ADDITIONAL DATA | HASH VALUE | OPERATION | DATE | REASON | OPERATOR |
| *******01 | — | — | — | — | DELETE | ** | SHIPPING SUSPENSION | ○○○○ |
| *******02 | — | — | — | — | DELETE | ** | DAMAGE DURING TRANSPORTATION | ○○○○ |

INFORMATION MANAGEMENT METHOD AND INFORMATION MANAGEMENT DEVICE

CROSS REFERENCE TO RELATED APPLICATION

The present application is a continuation application of International Patent Application No. PCT/JP2023/021171 filed on Jun. 7, 2023, which designated the U.S. and claims the benefit of priority from Japanese Patent Application No. 2022-102989 filed on Jun. 27, 2022. The entire disclosures of all of the above applications are incorporated herein by reference.

TECHNICAL FIELD

The disclosure herein relates to information management technique.

BACKGROUND

In the supply chain management system according to a conceivable technique, information such as delivery records of items acquired by traders that provide the supply chain is transmitted to a data management server of an administrator who manages the supply chain. As a result, it becomes possible to accumulate transaction records in the supply chain in a way that is difficult to falsify the records.

SUMMARY

According to an example, a reporter terminal manages information collected by a supplier under a management of an administrator. In an information management method implemented by the reporter terminal, transmission data based on reporter data prepared on the supplier side is transmitted to an information record server in connection with the administrator. In addition, a backup of the transmission data is prepared, and verification information to be used to verify that the backup has not been falsified. The backup is then stored in a reporter database together with the verification information.

BRIEF DESCRIPTION OF THE DRAWINGS

The above and other objects, features and advantages of the present disclosure will become more apparent from the following detailed description made with reference to the accompanying drawings. In the drawings:

FIG. 5 is a diagram showing an example of a backup stored in a reporter database;

FIG. 6 is a diagram showing an example of verification data stored in the reporter database;

FIG. 12 is a diagram showing an example of an intention confirmation record that is stored when a backup is changed.

DETAILED DESCRIPTION

In the supply chain management system according to a conceivable technique, each trader can leave a backup of transmission data in the own database. However, if the backup on the trader side is falsified, it becomes difficult to verify whether or not it has been falsified.

The present embodiments provide an information management method and an information management device that are capable of verifying whether a backup has been falsified.

In order to achieve the above object, one aspect of the present embodiments is an information management method implemented by a computer, for managing information collected by a reporter under a management of an administrator. The information management method causes at least one processor to execute a process including steps of: transmitting transmission data based on reporter data prepared by a reporter to a transmission destination in connection with an administrator; preparing a backup of the transmission data; preparing verification information to be used for verifying that the backup has not been falsified; and storing the backup together with the verification information in a database of the reporter.

Another aspect of the present embodiments is an information management device for managing information acquired by a reporter under a management of an administrator.

The information management device includes: a data transmission unit that transmits transmission data based on reporter data prepared by the reporter to a transmission destination in connection with the administrator; and a data storage unit that prepares a backup of the transmission data, prepares verification information to be used for verifying that the backup has not been falsified, and storing the backup together with the verification information in a database of the reporter.

In these embodiments, the verification information to be used for verifying that the backup of the transmission data has not been falsified is prepared and stored in the database of the reporter together with the backup. Therefore, by using the verification information, it is possible to verify that the backup has been falsified.

The following will describe embodiments of the present disclosure with reference to accompanying drawings. In the following description, the same reference symbols are assigned to corresponding components in each embodiment in order to avoid repetitive descriptions. In each of the embodiments, when only a part of the configuration is described, the remaining parts of the configuration may adopt corresponding parts of other embodiments. Further, not only the combinations of the configurations explicitly shown in the description of the respective embodiments, but also the configurations of multiple embodiments can be partially combined even when they are not explicitly shown as long as there is no difficulty in the combination in particular.

First Embodiment

Figure 1:
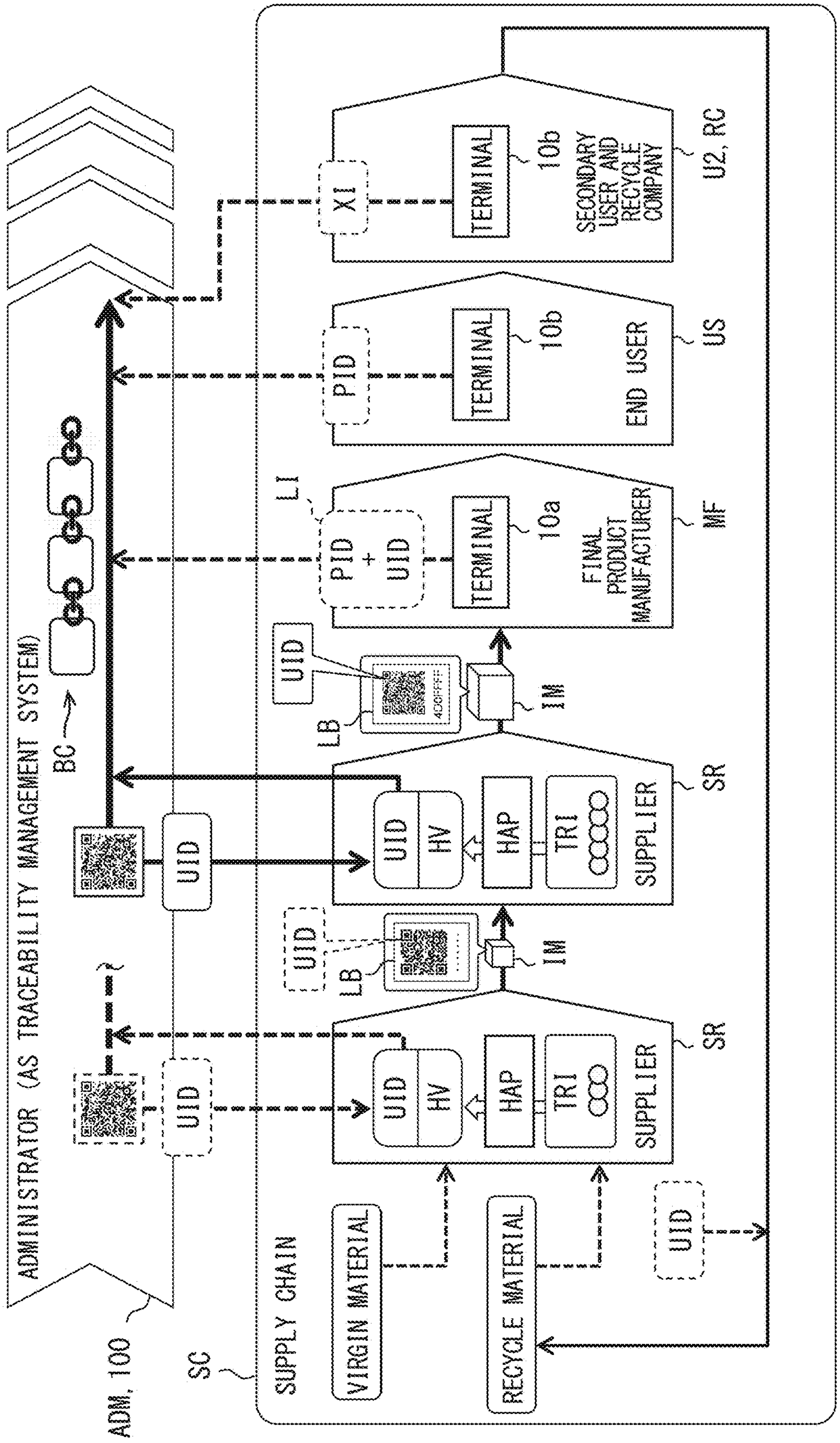
FIG. 1 is a diagram showing an overall view of traceability management according to a first embodiment of the present disclosure.

The supply chain SC in the first embodiment of the present disclosure shown in FIG. 1 is a connection between traders for delivering industrial products, agricultural products, marine products, and the like to end users US. The supply chain SC is established by including a plurality of suppliers SR and final product manufacturers MF as the traders. The final product supplied by the supply chain SC may be various items, such as automobiles, batteries, semiconductors, fresh foods, seafood, foods, flowers, pharmaceuticals, and chemicals, for example.

As an example, the supply chain SC for delivering industrial products to the end users US includes material miners, material producers, processors, and the like as the suppliers SR. Each supplier SR performs to process raw materials such as virgin materials and recycled materials, and/or items IM delivered from the previous process supplier SR, and ships them as other items IM to the next process supplier SR or the final product manufacturer MF. The supply chain SC may further include carriers, distributors, and the like involved in the distribution of the items IM and the final products. In addition, the supply chain SC may include end users US who use the final products, as well as secondary users U2 and recyclers RC who reuse, rebuild, recycle, and dispose the final products.

Figure 2:
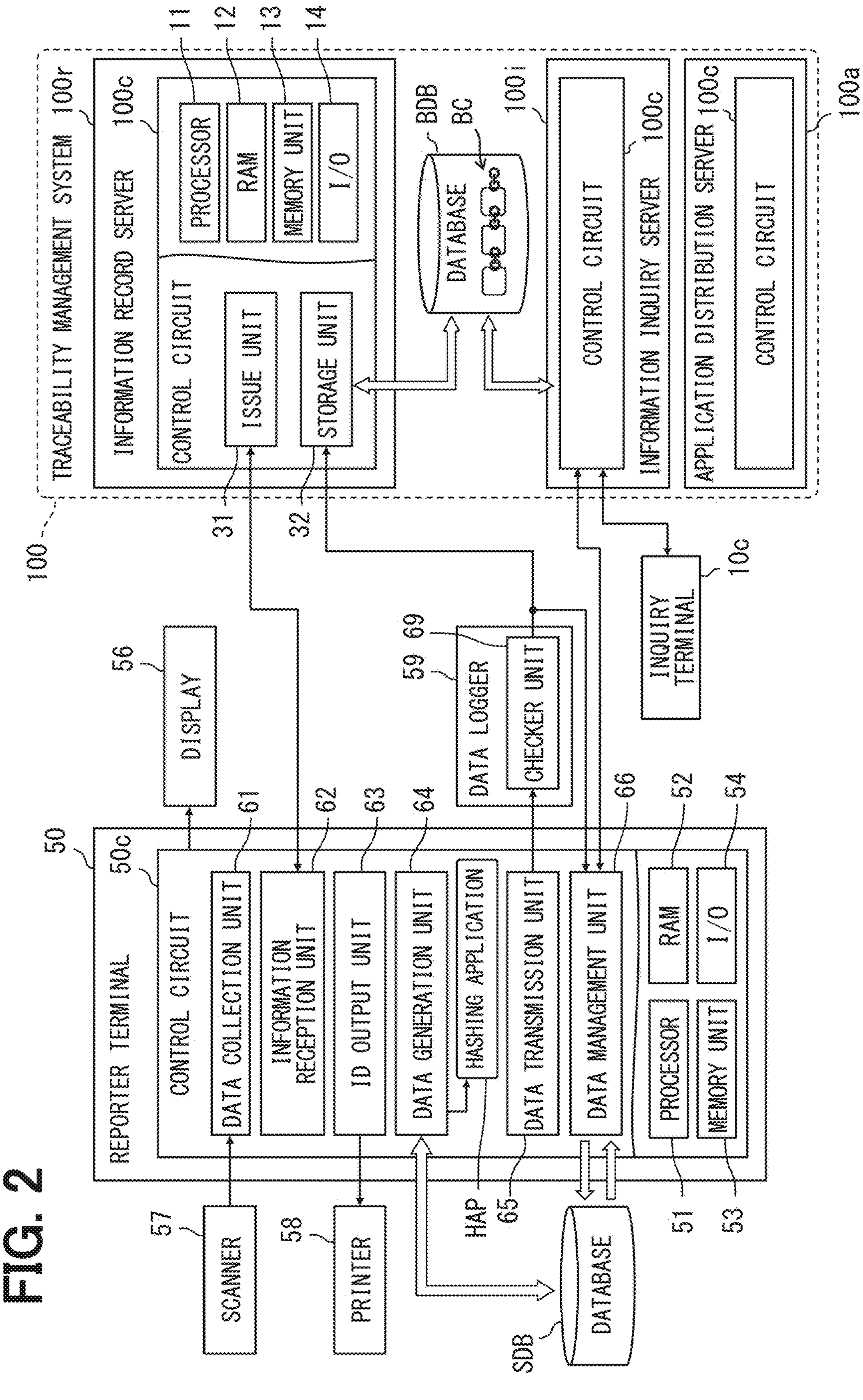
FIG. 2 is a block diagram showing the electric configuration of a system and a terminal related to the traceability management.
Figure 3:
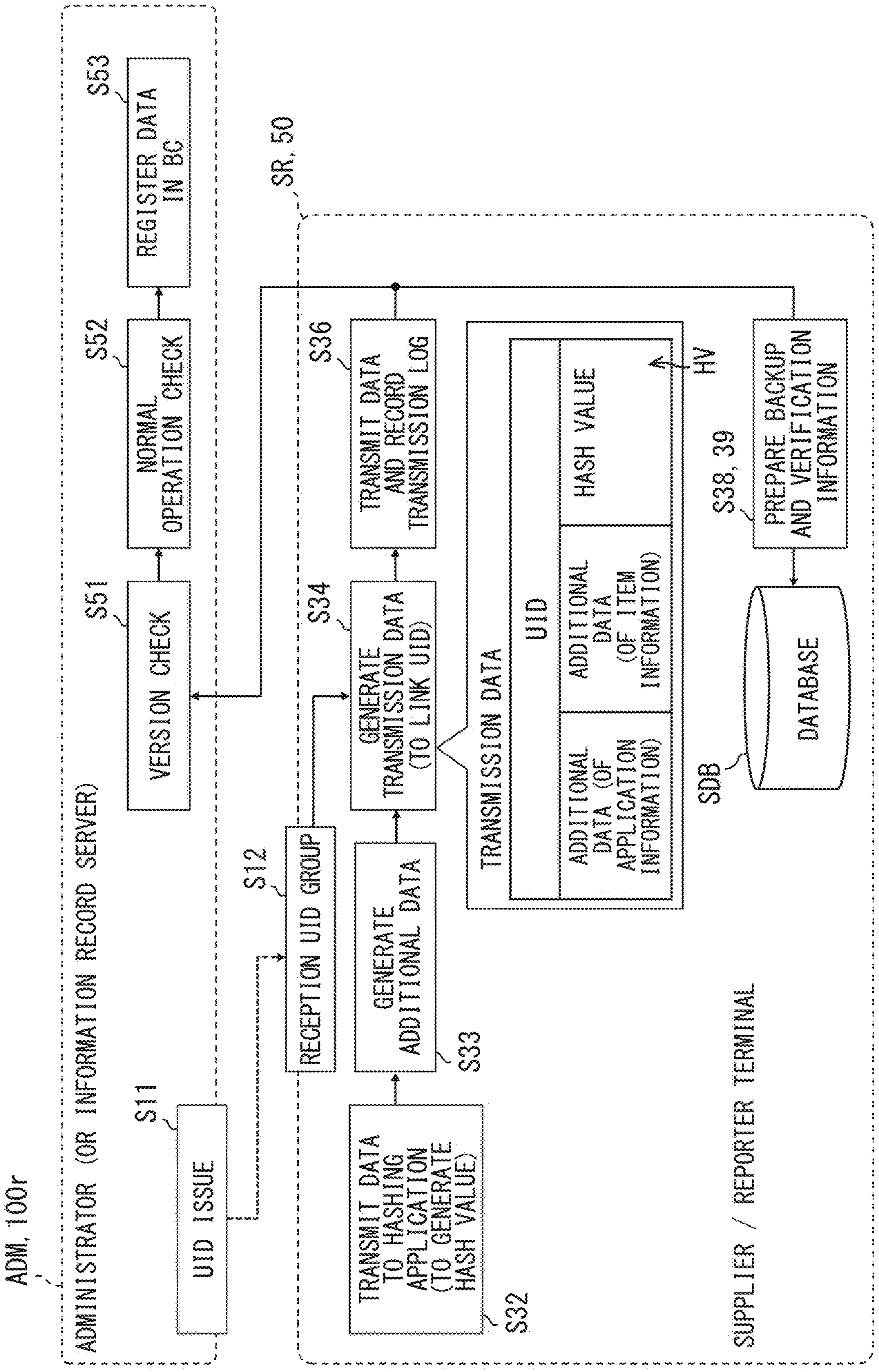
FIG. 3 is a diagram showing an overview of the main processes performed by the information storage server and a reporter terminal.

The supply chain SC is managed by an administrator ADM. The administrator ADM may be, for example, an agent entrusted with management tasks by the final product manufacturer MF, or the administrator ADM may be a supervisory authority with supervisory authority over the category to which the final product belongs, or an agent entrusted with management and inspection tasks by the supervisory authority. As shown in FIGS. 1 to 3, an administrator ADM operates a traceability management system 100 and manages various information recorded in the supply chain SC.

The traceability management system 100 is capable of communicating with a reporter terminal 50, a manufacturer terminal 10*a*, a user terminal 10*b*, and the like via a network. If the final product (e.g., an automobile, and the like) has a communication function, the traceability management system 100 may be able to communicate with the final product as well. The traceability management system 100 provides the information management using the blockchain BC technique, thereby storing information acquired through a network in a manner that it is substantially not possible to falsify the information. In addition, the traceability management system 100 collects information under the management of individual suppliers SR, and the like in response to requests from administrators ADM (or supervisory authorities), end users US, final product manufacturers MF, and the like, and discloses the information to the request sources.

The reporter terminal 50 is an information processing device operated by the supplier SR. The reporter terminal 50 is linked to each supplier SR. The reporter terminal 50 accumulates history information TRI and the like related to the item IM. The history information TRI is information such as from which trading company (i.e., the previous process supplier SR) raw materials or parts are purchased, and when they are acquired. Furthermore, information related to costs, greenhouse gas emissions (i.e., carbon footprint) caused by the production of the item IM, and the like may be recorded as the history information TRI.

The history information TRI is stored by the reporter terminal 50 and is disclosed to the outside depending on the situation. For example, if any defect occurs or is likely to occur in the item IM or the final product, the history information TRI is provided to other traders, the final product manufacturer MF, the end user US, and the like through the administrator ADM. The provided history information TRI is used for investigating the cause of the defect and the like. As described above, at least a part of the history information TRI serves as information for realizing the traceability of the item IM.

The reporter terminal 50 receives unique identification information (hereinafter, item identification information or UID) for identifying the item IM from the traceability management system 100. The item identification information UID is an identifier (i.e., unique identification) that does not overlap with other items. As an example, the item identification information UID is provided by a 32-digit character string. The item identification information UID may be issued not only to parts, and the like but also to recyclable materials, and the like. The item identification information UID is attached to the item IM shipped from the supplier SR, and is delivered to the trader in the next process together with the item IM. The reporter terminal 50 connects a hash value HV generated from the original data including the history information TRI for a specific item IM with the issued item identification information UID and uploads the hash value HV to the traceability management system 100.

The manufacturer terminal 10*a* is an information processing device operated by a final product manufacturer MF. The manufacturer terminal 10*a* generates link information LI (see FIG. 1) that links product identification information PID that identifies the final product with the item identification information UID of one or more items IM used in the final product. The manufacturer terminal 10*a* uploads the product identification information PID, the item identification information UID, and the link information LI to the traceability management system 100.

The user terminal 10*b* is an information processing device used by the end user US, the secondary user U2, or the recycler RC. For example, a smartphone or a tablet terminal can be used as the user terminal 10*b*. When the user terminal 10*b* is used by a secondary user U2 or a recycler RC, the user terminal 10*b* uploads change information XI (see FIG. 1) indicating a change in the usage manner of the item IM used in the final product to the traceability management system 100. For example, the change information XI indicating the disappearance of an item IM, or the change information XI requesting the correction or transfer of the link information LI, and the like is notified to the traceability management system 100.

The manufacturer terminal 10*a* and the user terminal 10*b* can request the traceability management system 100 to disclose the history information TRI related to the final product or item IM using the product identification information PID or the item identification information UID. The manufacturer terminal 10*a* and the user terminal 10*b* acquire the history information TRI from the traceability management system 100 and display the history information TRI on a display or the like. As described above, the end user US, the secondary user U2, the recycler RC, and the final product manufacturer MF can view the history information TRI using the manufacturer terminal 10*a* or the user terminal 10*b* as the inquiry terminal 10*c*.

Next, the traceability management system 100 and the reporter terminal 50 will be described in further detail with reference to FIGS. 1 to 3.

The traceability management system 100 includes an application distribution server 100*a*, an information record server 100*r*, and an information inquiry server 100*i*. Each of the servers 100*a*, 100*r*, and 100*i* is an information processing device mainly including a control circuit 100*c*. The control circuit 10*c* includes a processor 11, a RAM (i.e., Random Access Memory) 12, a memory unit 13, an input/output interface 14, and a bus connecting these, and functions as a computer that performs calculation processing. The processor 11 is hardware for performing the calculation processing that is coupled to the RAM 12, and executes a program stored in the memory unit 13.

The application distribution server 100*a* functions as a server device that distributes the hashing application HAP. The hashing application HAP is an application program that is installed in each reporter terminal 50. The hashing application HAP performs a hashing process in each reporter terminal 50 based on rules specified by the administrator ADM to hash the reporter data including at least the history information TRI, and generates a hash value HV. The hashing application HAP enables maintaining security in the traceability management through regular updates. The hashing application HAP may be distributed by the platform of the operating system that runs the reporter terminal 50.

The information record server 100*r* functions as an information management device on the administrator ADM side that manages information related to the item IM. The information record server 100*r* manages various pieces of information collected by the suppliers SR and the like under the management of the administrator ADM and submitted to the administrator ADM. The information record server 100*r* has functional units such as an issue unit 31 and a storage unit 32 by executing an information management program stored in the memory unit 13 by the processor 11 (see FIG. 2).

By performing the ID issue process, the issue unit 31 issues the item identification information UID to the reporter terminal 50 linked to each supplier SR (see S11 in FIG. 3). The issue unit 31 executes an ID issue process in response to a request from a supplier SR (i.e, the reporter terminal 50) and issues the item identification information UID with the number of pieces that the supplier SR requires. The issue unit 31 can execute at least one of a batch process for issuing a predetermined number of pieces of the item identification information UIDs at once, a process for issuing the item identification information UID at any time, and a process for post-issuing the item identification information UID. More specifically, when a request based on a production plan or the like is received from a supplier SR as a reporter side, the issue unit 31 issues a certain number of required pieces of the item identification information UID in advance in response to the request. Furthermore, the issue unit 31 accepts an issue request for the item identification information UID each time storage target data is generated at the supplier SR, and issues the item identification information UID on demand in response to this request. Furthermore, the issue unit 31 later issues the item identification information UID for data (with the hash value HV) uploaded by the reporter terminal 50 and not linked to the item identification information UID. In this case, the administrator ADM is notified of the allocation results of the item identification information UID, and the uploaded data is stored in a process to be described later.

By performing a data storage process, the storage unit 32 stores the information acquired from the reporter terminal 50 in a blockchain database (hereinafter, BC database) BDB. The BC database BDB stores data as the storage target, such as the hash value HV linked to the item identification information UID and additional data, in a manner that it is substantially impossible to falsify the data using the technique of the blockchain BC. As an example, the BC database BDB sets the acquired storage target data as a transaction and stores the data in a block of a private or consortium blockchain BC. In the BC database BDB, it is difficult to falsify the storage target data stored in each block by hashing the information stored in one block and storing the information in the next block. Furthermore, the form of the blockchain BC is not limited to private and consortium types. In another example, a public blockchain BC may be used. Specifically, in the BC database BDB, it is substantially impossible to falsify the storage target data by storing the hash value generated from the storage target data in a block of the public blockchain BC.

The storage unit 32 verifies the validity of the hash value HV acquired from the reporter terminal 50 during the data storage process. Here, the history information TRI and the like, which is the original data used to generate the hash value HV in the reporter terminal 50, is not provided to the information record server 100*r*. Therefore, when the correct hashing application HAP is being used in the reporter terminal 50 and the hashing application HAP is operating normally, the storage unit 32 determines that the hash value HV is correct.

Specifically, the storage unit 32 checks the version of the hashing application HAP running on the reporter terminal 50 based on the application information (described later) of the additional data acquired from the reporter terminal 50 (see S51 in FIG. 3). If an improper hashing application HAP, such as an application of unknown origin or an old version hashing application HAP that is no longer usable, is being used on the reporter terminal 50, the storage unit 32 determines the negative that the validity of the hash value HV cannot be guaranteed.

If an proper hashing app HAP is being used on the reporter terminal 50, the storage unit 32 further checks whether the hashing app HAP is operating normally (see S52 in FIG. 3). The information record server 100*r* provides the reporter terminal 50 with dummy data for verification to be input into the hashing application HAP in place of the history information TRI. The storage unit 32 acquires a hash value for verification based on the dummy data from the reporter terminal 50. If the verification hash value is a correct value, the storage unit 32 determines that the hashing application HAP is operating normally and that the validity of the hash value HV can be guaranteed. In this case, the storage unit 32 stores the hash value HV and the additional data, and the like in the BC database BDB in a state linked to the item identification information UID (see S53 in FIG. 3). As a result of the above, the storage target data is registered in the blockchain BC.

The information inquiry server 100*i* is a server device that performs a process of disclosing the history information TRI and the like to an inquirer who uses the manufacturer terminal 10*a*, the user terminal 10*b*, or the like as an inquiry terminal 10*c*. Specifically, when the information inquiry server 100*i* receives a disclosure request from the inquiry terminal 10*c*, the information inquiry server 100*i* specifies the item identification information UID which is the collection target of the history information TRI, based on the product identification information PID or the item identification information UID acquired together with the disclosure request. The information inquiry server 100*i* specifies the supplier SR (i.e., the reporter terminal 50) requesting the provision of the history information TRI based on the specified item identification information UID. The information inquiry server 100*i* transmits a request for providing the history information TRI to each of the specified reporter terminals 50, and receives the original data such as the history information TRI from each of the reporter terminals 50. The information inquiry server 100*i* checks whether the history information TRI acquired from each reporter terminal 50 has been falsified. The information inquiry server 100*i* generates data to be provided using the history information TRI that has been confirmed to have not been falsified, and provides the generated provision data to the inquiry terminal 10*c* that is the source of the disclosure request.

The above-described information record server 100*r* and the information inquiry server 100*i* may be on-premise server devices that are physically managed by an administrator ADM or a platform provider, and the like, or may be virtual configurations provided on the cloud. That is, each of the above-described functional units may not be limited to being established in the control circuit 100*c*, alternatively, each of the above-described functional units may be established in a server of a third party entrusted with the administrator ADM or the platform provider. Furthermore, the BC database BDB may also be established within a virtual file server provided on the cloud.

The reporter terminal 50 mainly includes a control circuit 50*c*, and is electrically connected to a display 56, a scanner 57, a printer 58, and the like. At least some of the display 56, the scanner 57, and the printer 58 may be integral with the reporter terminal 50. Furthermore, an input device such as a keyboard may be connected to the reporter terminal 50 for error processing, for example.

The display 56 is a display device including a liquid crystal panel, an organic EL panel, or the like. The display 56 displays various images on the screen based on the display control by the control circuit 50*c*. For example, the display 56 displays an image presenting the history information TRI based on the provision data, an image notifying error information received from the information record server 100*r*, and the like. The display 56 has a function of a touch panel that receives a user operation.

The scanner 57 is a reading device that reads the attached label LB (see FIG. 1). The scanner 57 includes an area sensor in which CCD elements are arranged two-dimensionally. The attached label LB is a paper medium, a film medium, or the like on which the two-dimensional code CDq is printed. The two-dimensional code CDq is, for example, a QR code (registered trademark). The two-dimensional code CDq provides the item identification information UID recorded therein. The scanner 57 reads the two-dimensional code CDq printed on the attached label LB, and outputs the item identification information UID extracted from the two-dimensional code CDq to the control circuit 50*c*. The two-dimensional code CDq may be displayed on a display device such as a display or an electronic paper, or may be engraved or printed directly on the item IM using a laser marker or an inkjet printer, or the like.

The printer 58 is an output device that outputs the attached label LB. The printer 58 prints a two-dimensional code CDq based on the item identification information UID provided by the information record server 100*r* on a paper medium (such as a sticker) and outputs the two-dimensional code CDq as an attached label LB. The attached label LB is attached, for example, to the outer surface of the item IM and is distributed together with the item IM. Here, instead of the attached label LB output on demand from the printer 58, the attached label LB printed and issued in advance by the administrator ADM and provided to the supplier SR may be distributed together with the item IM. Furthermore, when the two-dimensional code CDq is directly engraved or printed on the item IM, the above-described laser marker or the like can be used as an output device instead of the printer 58.

The control circuit 50*c* of the reporter terminal 50 includes a processor 51, a RAM 52, a memory unit 53, an input/output interface 54, a bus connecting these components, and the like, and functions as a computer that performs calculation processing. The processor 51 is hardware for calculation processing coupled with the RAM 52. The memory unit 53 stores an information management program for the reporter, a hashing application HAP, and the like. The reporter terminal 50 has functional units such as a data collection unit 61, an information reception unit 62, an ID output unit 63, a data generation unit 64, a data transmission unit 65, and a data management unit 66 by executing programs and applications stored in the memory unit 53 (see FIG. 2). The reporter terminal 50 performs a reporter process (see FIG. 4) through cooperation between the various functional units.

The data collection unit 61 acquires data of the item identification information UID from the scanner 57 that reads the label LB attached to the item IM delivered to the supplier SR. In addition, in the reporter process, the data collection unit 61 prepares the reporter data as the hashing target data (see S31 in FIG. 4). The reporter data is information collected and prepared by the supplier SR, and is information related to the item IM shipped from the supplier SR. The reporter data includes, in addition to the history information TRI, product information indicating the type of the item IM (i.e., the product) being shipped, lot information indicating the lot number of the product, and the like (see FIG. 5). The data collection unit 61 may automatically acquire the reporter data from another server device installed at the base of the supplier SR, or may acquire the reporter data manually entered by an operator of the supplier SR in accordance with a predetermined management process.

The information reception unit 62 requests the issue unit 31 to issue the item identification information UID to be attached to the item IM shipped from the supplier SR. The information reception unit 62 receives the item identification information UID issued based on the issuance request from the issue unit 31 (see S12 in FIG. 3). The information reception unit 62 accumulates the received item identification information UIDs, and provides the item identification information UID to the ID output unit 63 and the data generation unit 64 in accordance with the shipment of the item IM. In addition, the information reception unit 62 acquires the dummy data to be used to determine whether the hashing application HAP is operating normally from the information record server 100*r*, and provides the dummy data to the data generation unit 64.

The ID output unit 63 is connected to the printer 58. The ID output unit 63 causes the printer 58 to output the attached label LB. The ID output unit 63 uses the data of the item identification information UID provided by the information reception unit 62 to generate a two-dimensional code CDq in which the item identification information UID is recorded. The ID output unit 63 outputs print data including the two-dimensional code CDq to the printer 58, and causes the printer 58 to print the attached label LB. As described above, in a configuration in which the attached label LB on which the item identification information UID is printed is provided by the manager ADM, the ID output unit 63 and the printer 58 do not need to be provided in the reporter terminal 50.

The data generation unit 64 uses the reporter data collected by the data collection unit 61 to generate transmission data to be uploaded to the information record server 100*r*. In the reporter process, the data generation unit 64 transmits the reporter data including the history information TRI to the hashing application HAP and generates a hash value HV (see S32 in FIGS. 3 and 4). Furthermore, the data generation unit 64 generates the additional data to be added to the hash value HV (see S33). The data generation unit 64 prepares, as the additional data, the application information related to the hashing application HAP and the item information related to the item IM. The application information includes, for example, information indicating the version of the hashing application HAP that is currently running, information indicating the provider of the hashing application HAP, and the like.

The data generation unit 64 acquires the item identification information UID from the information reception unit 62. The data generation unit 64 generates transmission data by linking the acquired item identification information UID with the hash value HV and the additional data (see S34). The hash value HV and the additional data included in the transmission data are displayed on the display 56 for confirmation by the operator (see S35). At this time, the operator may be asked whether or not the operator agrees to the transmission.

The data transmission unit 65 controls the transmission of information from the reporter terminal 50 to the information record server 100*r*. The data transmission unit 65 transmits, for example, a hash value based on the dummy data to the information record server 100*r*. In addition, in the reporter process, the data transmission unit 65 transmits the transmission data based on the reporter data to the information record server 100*r*, which is the transmission destination linked to the administrator ADM (see S36 in FIGS. 3 and 4).

The data transmission unit 65 is connected to the data logger 59. The data logger 59 records a transmission log of data transmitted to the information record server 100*r*. The data logger 59 provides a backup of the transmission data transmitted to the information record server 100*r* to the data management unit 66 together with a transmission log. The transmission log records information indicating what data was transmitted to which destination. The function of the data logger 59 may not be provided on the supplier SR side. The function of the data logger 59 may be provided in a shared area established with the agreement of the supplier SR and the administrator ADM. Furthermore, the function of the data logger 59 may be provided in a part of the administrator's area (i.e., in the traceability management system 100) established with the agreement of the supplier SR and the administrator ADM.

The data logger 59 has a checker unit 69. The checker unit 69 checks whether the transmission data having the same contents as the backup has been transmitted to the information record server 100*r*. The checker unit 69 records information indicating that the backup provided to the data management unit 66 is identical to the transmission data transmitted to the information record server 100*r* in the transmission log to be provided to the data management unit 66. Only when the checker unit 69 determines that the two pieces of data are identical in the same content, the data logger 59 normally ends the data transmission. If the checker unit 69 determines that the two pieces of data are not identical, the data logger 59 may transmit an error notification to at least one of the information record server 100*r* and the data management unit 66.

The data management unit 66 is connected to the reporter database SDB. The data management unit 66 manages the data stored in the reporter database SDB. The reporter database SDB stores the reporter data, such as the history information TRI, which is the original data of the transmission data. The reporter database SDB may be provided by a local storage device located at the base of the supplier SR, or may be provided by a storage on the cloud. The data management unit 66 performs processes related to storing information in the reporter database SDB and extracting information from the reporter database SDB.

Figure 4:
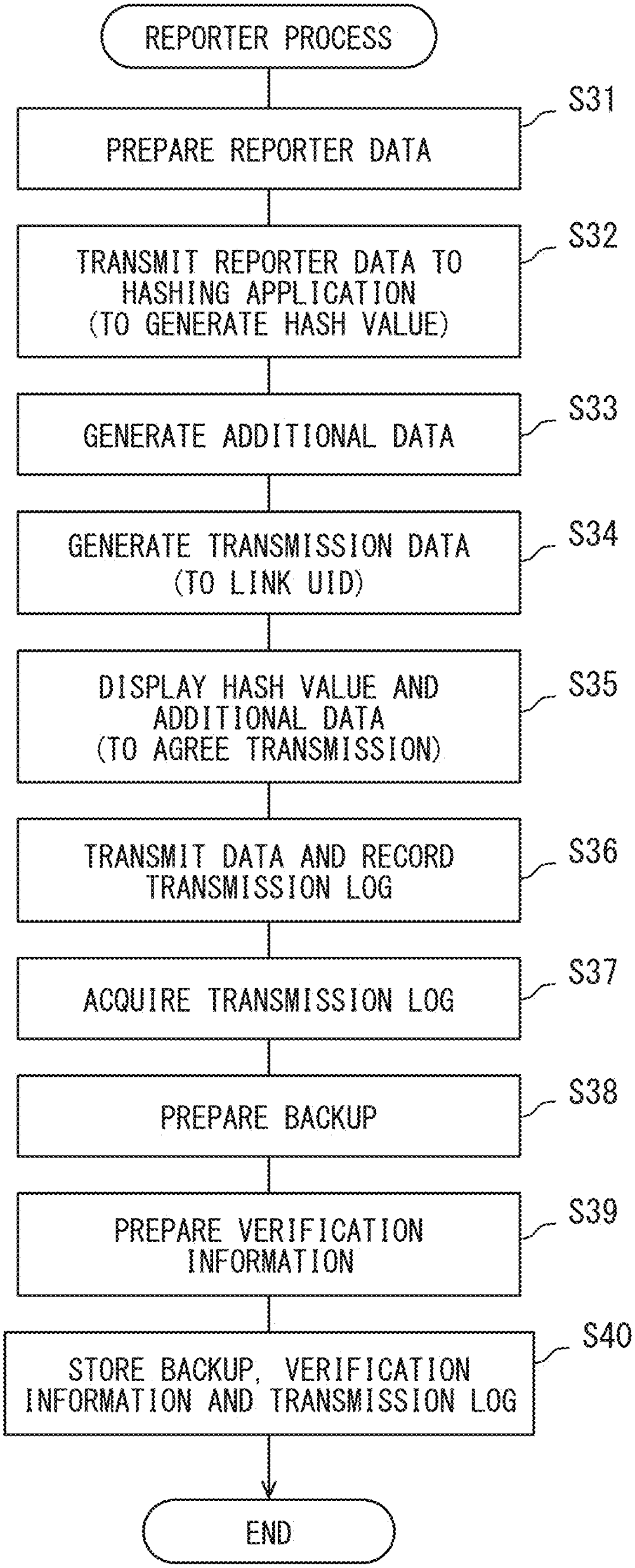
FIG. 4 is a flowchart showing details of a reporter process performed in the reporter terminal.
Figure 7:
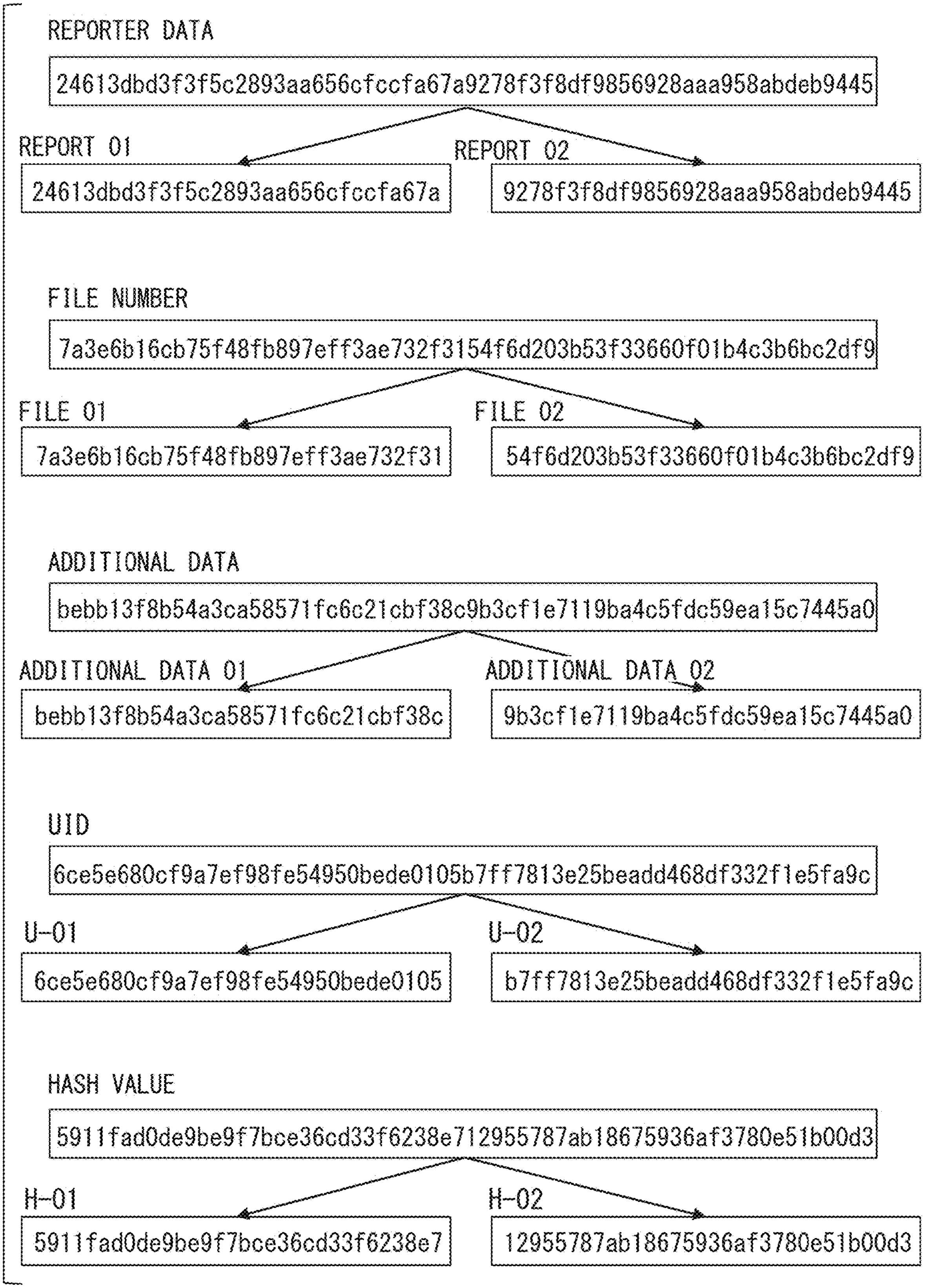
FIG. 7 is a diagram showing one pattern of a process for generating the verification data together with FIG. 8.

During the reporter process, the data management unit 66 acquires the transmission log of the transmission data from the data logger 59 (see S37 in FIG. 4). In addition, the data management unit 66 prepares a backup of the transmission data by acquiring information from the data logger 59 (see S38 in FIGS. 3 and 4). Furthermore, the data management unit 66 further prepares verification information to be used to confirm that the backup has not been falsified (see S39). The verification information is information related to the fraud prevention function provided in the reporter terminal 50. The data management unit 66 generates a file number and hashed data, which will be described later, as the verification information. The data management unit 66 associates the backup, the verification information, and the transmission log with the reporter data and stores them in the reporter database SDB (see S40).

The data management unit 66 receives a request for provision from the information inquiry server 100*i*. The provision request is made by the supplier SR and the final product manufacturer MF, who are located on the post-process side (i.e., the downstream side) in the supply chain SC (see FIG. 1), as well as the administrator ADM of the supply chain SC and the supervisory authorities, and the like. The end user US, the secondary user U2 and the recycler RC may be the implementers of the provision request. The provision request is made for the purpose of requesting disclosure of the history information TRI related to the item IM, verifying the validity of the disclosed information, and for other purposes. The data management unit 66 grasps the item identification information UID notified together with the provision request, and extracts the history information TRI (i.e., the reporter data) linked to the item identification information UID from the reporter database SDB. The data management unit 66 provides the extracted history information TRI and the like to the information inquiry server 100*i*.

Next, the details of the backup and the verification information stored in the reporter database SDB will be further described based on FIGS. 5 to 12 and with reference to FIGS. 1 to 3.

The data management unit 66 assigns a file number to the backup of the transmission data generated from the reporter data. The file number is a management number having a predetermined number of consecutive digits, and is the verification information used to confirm that the backup has not been deleted. The data management unit 66 sets a backup with a file number assigned therein as the management data. In the management data, one file number is associated with the item identification information UID, the additional data including the item information and the application information, and a hash value HV. The data management unit 66 generates storage data (see FIG. 5) to be stored in the reporter database SDB by combining the management data with the reporter data, which is the original data for the backup.

The data management unit 66 further generates the hashed data by hashing the backup (i.e., the management data) using a hash function. The hashed data is the verification information to be used to verify that the contents of the backup have not been falsified. The data management unit 66 may use the hashing application HAP to generate the hashed data, or may use a hash function different from the hashing application HAP (for example, SHA-256, and the like). The data management unit 66 generates the hashed data by hashing the file number, the item identification information UID, the additional data, and the hash value HV (see FIG. 6).

To improve security, the data management unit 66 can generate the hashed data by hashing and combining the reporter data with the backup. The data management unit 66 inputs the reporter data, the file number, the additional data, the item identification information UID, and the hash value HV into a hash function individually, and acquires each hashed value. Furthermore, the data management unit 66 divides each of the hashed values into two pieces (see FIG. 7).

In the following description, the first and second halves of the hashed value of the reporter data will be referred to as "REPORT-01" and "REPORT-02", respectively, and the first and second halves of the hashed value of the file number will be referred to as "FILE-01" and "FILE-02", respectively. In addition, the first and second half of the value acquired by hashing the additional data will be referred to as "ADDITIONAL DATA-01" and "ADDITIONAL DATA-02", respectively, and the first and second half of the value acquired by hashing the item identification information UID will be referred to as "U-01" and "U-02", respectively. Furthermore, the first and second halves of the hashed value acquired by hashing the hash value HV are referred to as "H-01" and "H-02", respectively.

Figure 8:
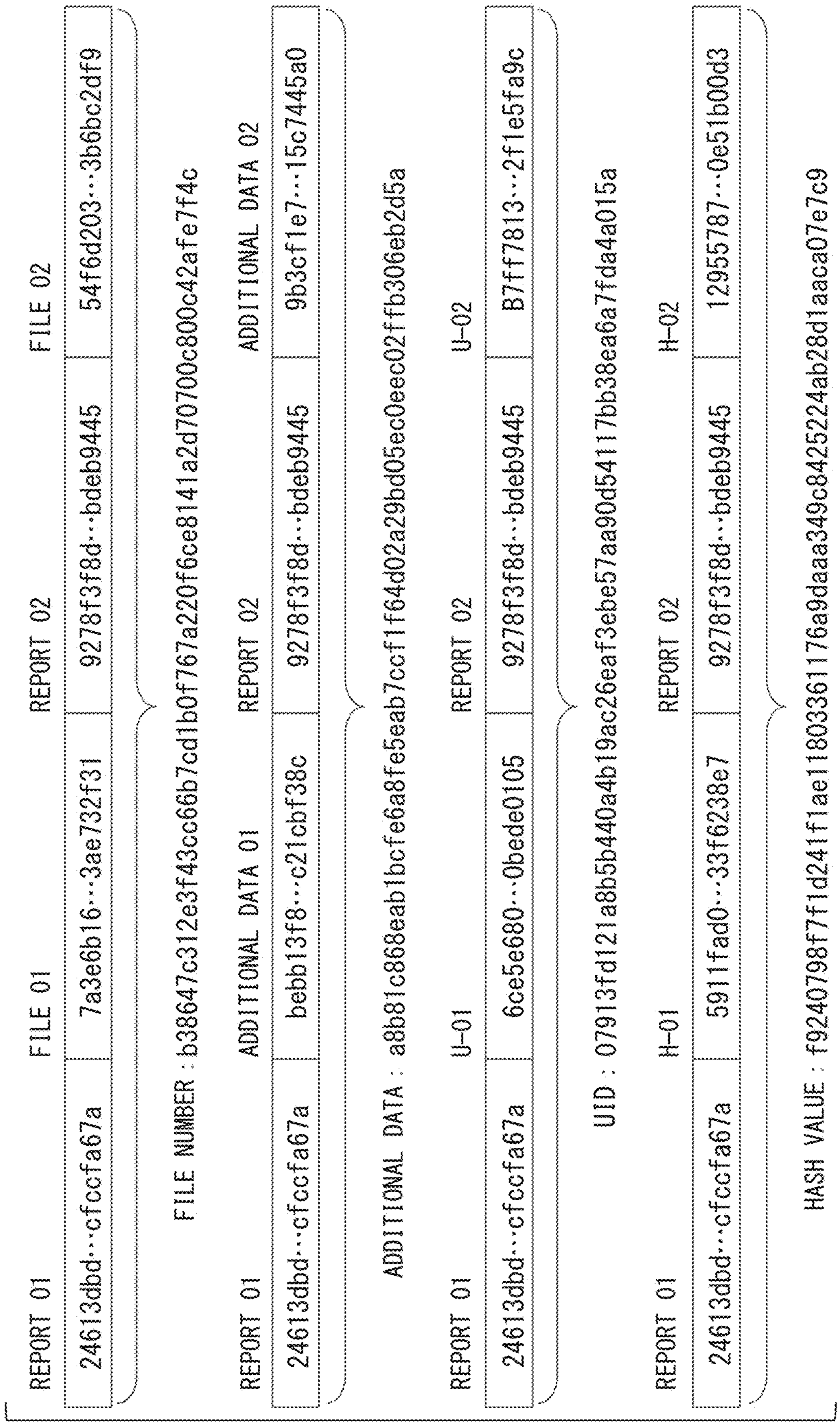
FIG. 8 is a diagram showing one pattern of a process for generating the verification data together with FIG. 7.
Figure 9:
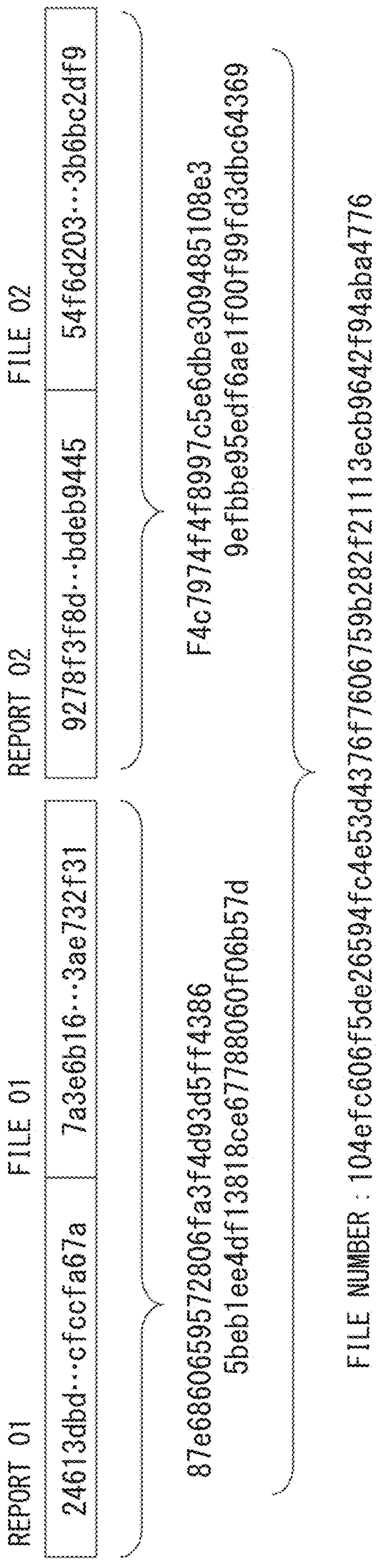
FIG. 9 is a diagram showing another pattern of the process for generating the verification data together with FIG. 7.

The data management unit 66 further hashes a character string that combines other hashed values based on the hashed value of the reporter data (see FIG. 8). Specifically, the value acquired by inputting the character strings of "REPORT-01", "FILE-01", "REPORT-02", and "FILE-02" in this order into a hash function is set as the value of the hashed file number. Similarly, the value acquired by inputting the character strings of "REPORT-01", "ADDITIONAL DATA-01", "REPORT-02", and "ADDITIONAL DATA-02" in this order into a hash function is set as the value of the hashed additional data. Furthermore, the value acquired by inputting the character strings of "REPORT-01", "U-01", "REPORT-02", and "U-02" in this order into a hash function is set as the value of the hashed item identification information UID. Furthermore, the value acquired by inputting the character strings of "REPORT-01", "H-01", "REPORT-02", and "H-02" in this order into a hash function is set as the hashed hash value HV. The data management unit 66 combines each hashed value (i.e, the hashed data) with the reporter data and stores it as the verification data in the reporter database SDB.

The data management unit 66 changes the content of the process for hashing the reporter data based on a predetermined trigger. The data management unit 66 changes the method of dividing the hashed values, the arrangement of the divided values (i.e., the character strings), the method of hashing the arranged values, and the like based on a predetermined trigger. The data management unit 66 changes the pattern of the hashing process when a predetermined trigger occurs, such as a trigger that the predetermined period of time has elapsed, a trigger of a change in date and time, or a trigger of a change in the version of the hashing application HAP. The data management unit 66 records a pattern identifier indicating the pattern of the applied hashing process in the verification data (see FIG. 8). For convenience, the above-described hashing process is referred to as the "PATTERN 1" of the hashing process.

Here, another pattern of the hashing process performed by the data management unit 66 will be further explained. In the hashing process of "PATTERN 2" (see FIG. 9), the hashed values of "REPORT-01" and "FILE-01", and the hashed values of "REPORT-02" and "FILE-02" are generated. The Merkle root of each value is set as the value of the hashed file number. Similarly, the Merkle roots of "REPORT-01" and "ADDITIONAL DATA-01" and "REPORT-02" and "ADDITIONAL DATA-02" are set as the values of the hashed additional data. In addition, the Merkle roots of "REPORT-01" and "U-01", and "REPORT-02" and "U-02" are set as the value of the hashed item identification information UID. Furthermore, the Merkle roots of "REPORT-01" and "H-01", and "REPORT-02" and "H-02" are set as the value of the hashed hash value HV.

Figure 10:
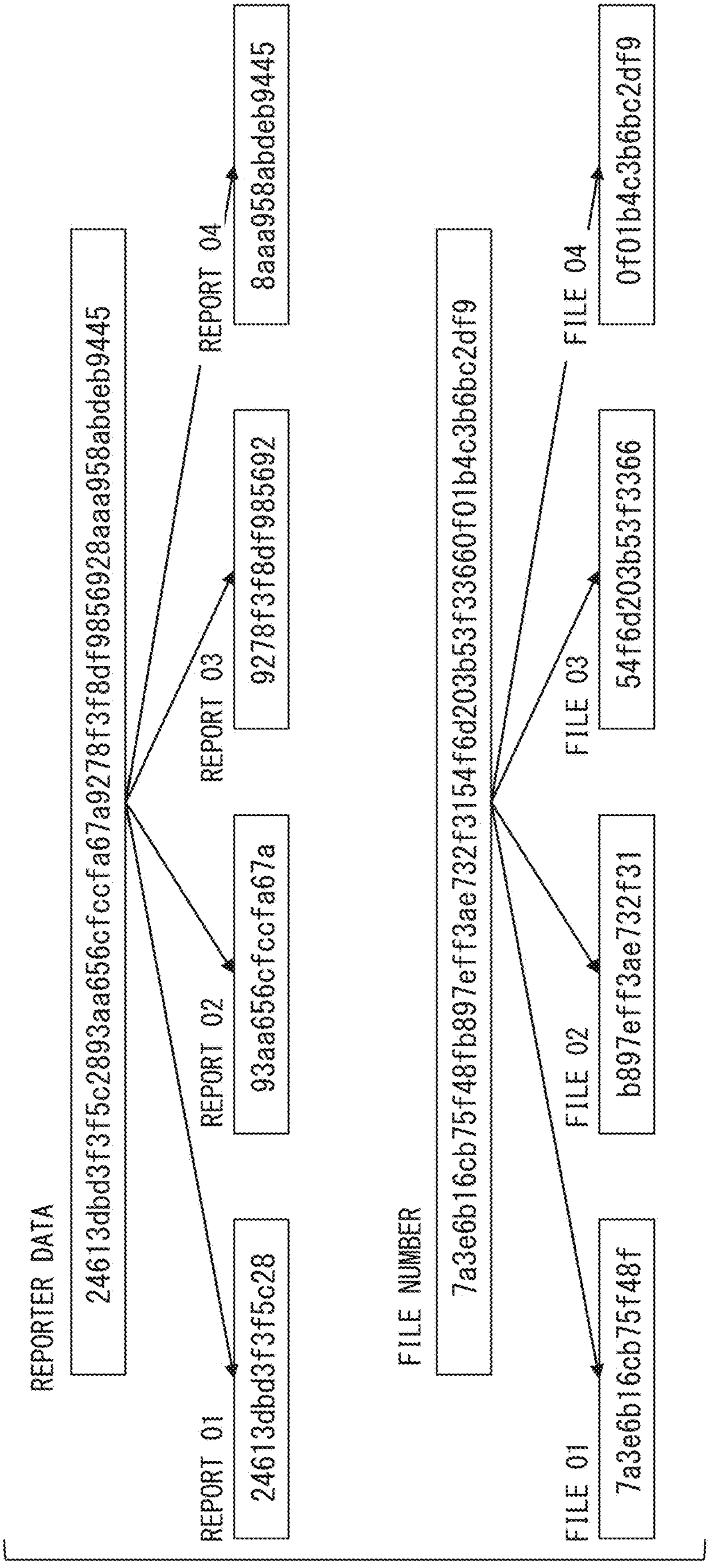
FIG. 10 is a diagram showing further another pattern of a process for generating the verification data together with FIG. 11.
Figure 11:
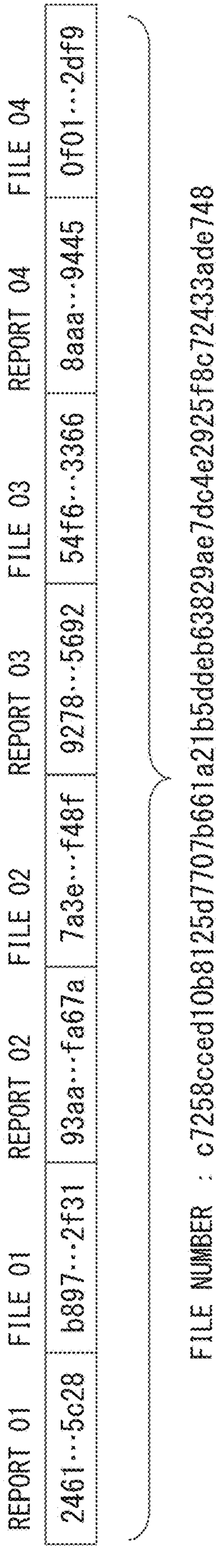
FIG. 11 is a diagram showing further another pattern of a process for generating the verification data together with FIG. 10.

Furthermore, in the hashing process of "PATTERN 3", the data management unit 66 hashes the reporter data, file number, additional data, item identification information UID, and hash value HV individually, and divides each hashed value into four (see FIG. 10). Through this process, "REPORT-01" to "REPORT-04" and "FILE-01" to "FILE-04" and so on are prepared.

The data management unit 66 arranges the divided values in ascending order and inputs them into a hash function to generate each hashed value. Specifically, the value acquired by inputting the string of characters of "REPORT-01," "FILE-01," "REPORT-02," "FILE-02," "REPORT-03," "FILE-03," "REPORT-04," and "FILE-04," in this order, into a hash function is set as the value of the hashed file number (see FIG. 11). The data management unit 66 also performs a similar hashing process on the additional data, the item identification information UID, and the hash value HV, to generate a hashed value for each element.

The data management unit 66 can verify whether or not the management data (i.e, the backup) stored in the reporter database SDB has been falsified by comparing the management data with hashed verification data (see FIG. 6). In the verification data, the management data is hashed for each value (i.e., item), so that the data management unit 66 can detect which part has been falsified. More specifically, in the process of verifying the management data, the data management unit 66 hashes each value of the management data using the same hashing process as that used to generate the hashed data. The data management unit 66 checks whether each hashed value differs from each value stored as the verification data.

As an example, if only the item identification information UID has been falsified in the management data, the hash value of the item identification information UID recalculated from the management data will differ from the value registered in the item identification information UID as the verification data. Based on these differences in values, the data management unit 66 specifies the position of the falsified management data.

As another example, if the reporter data has been falsified, the recalculated hash values of all items will differ from the values registered in the verification data. Therefore, if all of the recalculated values do not match the values of the verification data, the data management unit 66 estimates that there is a high possibility that the reporter data has been falsified.

In order to prevent falsification under the disguise of fault, the data management unit 66 generally prohibits editing of the accumulation data. When making any changes to the accumulation data, the data management unit 66 confirms the intention of the operator and adds an intention confirmation record that records details of the applied changes to the accumulation data. The intention confirmation record records the details of the change operation (e.g., deletion, and the like), the date and time of the change, the reason for the change (e.g., shipping suspension, damage during transportation, and the like), and the operation who made the change (see FIG. 12). The data management unit 66 starts a change record process based on the start of a change operation by the operator, and grasps the contents of the changes made to the accumulation data (i.e., the backup). The data management unit 66 generates an intention confirmation record based on the grasped contents of the changes. The data management unit 66 links the generated intention confirmation record to accumulation data including the backup and stores it in the reporter database SDB.

In the first embodiment described above, confirmation information to be used to confirm that the backup (i.e., the management data) of the transmission data has not been falsified is prepared and stored in the reporter database SDB together with the backup. Therefore, by using the verification information, it is possible to verify that the backup has been falsified.

In the first embodiment, a backup of the transmission data is left on the side of the supplier SR who is the reporter. Therefore, if the administrator ADM extracts the transmission data (i.e., the storage target data), the occurrence of such extraction can be verified using the backup on the reporter's side. Furthermore, if it becomes possible to verify using the verification information that the reporter has not falsified the backup, it will also be possible to prove from the backup and the verification information on the reporter side that the administrator ADM has not extracted any transmission data. According to the above, it is possible for the administrator ADM and the reporter to share the fact that no unauthorized data extraction has taken place.

Additionally, in the first embodiment, a file number serving as a consecutive management number is assigned to the backup to be stored in the reporter database SDB as the verification information. Therefore, even if the backup stored in the reporter database SDB is deleted together with the reporter data, the reporter terminal 50 can detect the deletion of the backup based on the fact that the file numbers are not consecutive. As a result of the above, it is possible to confirm that no unauthorized data deletion has occurred, and therefore it becomes possible to use the accumulation data stored in the reporter database SDB as evidence during audits related to the record-maintenance status.

In the first embodiment, the hashed data is generated as the verification information by hashing the backup using a hash function. Therefore, even if a specific item of the backup stored in the reporter database SDB is changed, it is possible to detect the falsifying based on a comparison with the hashed verification data.

Furthermore, in the first embodiment, the values acquired by individually hashing each item of the backup are registered in the verification data table. Therefore, in the verification process of the backup (i.e., the management data), it becomes possible to specify which items of the management data have been falsified based on an individual comparison of the hash value recalculated for verification with the hashing registered in the verification data.

Furthermore, in the first embodiment, the hashed data is generated by hashing the reporter data in combination with the backup. Therefore, it is also possible to check whether the reporter data stored in the reporter database SDB has been falsified using the hashed data of the backup.

Additionally, in the first embodiment, the content of the process of hashing the backup is changed arbitrarily or periodically. Such pattern changes improve resistance to leakage and guessing. Therefore, it is possible to avoid a situation in which both the backup and the hashed data are falsified to make them consistent with each other, and the detection of falsifying the backup using the hashed data may not function. As a result, a high level of backup security can be maintained.

In the first embodiment, the data management unit 66 acquires a transmission log that records that the transmission data having the same content as the backup has been transmitted to the transmission destination. The data management unit 66 stores the transmission log together with the backup in a database. Therefore, based on the transmission log, it is possible to prove that there has been no extraction of the transmission data on the administrator ADM side without the intention or knowledge of the supplier SR (i.e., the transmission side).

Furthermore, in the first embodiment, when a change is made to a backup, an intention confirmation record that records the details of the change made to the backup is stored in association with the backup. In this way, by clearly confirming the intention and then recording the changes, it is possible to distinguish between accidental deletion of a backup and malicious, intentional deletion of a backup. In this way, if the history of the changes can be tracked, the accumulation data is much effective as evidence during audits related to the record-maintenance status.

In the first embodiment, the reporter terminal 50 corresponds to the "information management device", the control circuit 50*c* corresponds to the "computer", and the data management unit 66 corresponds to the "data storage unit". In addition, the reporter database SDB corresponds to a "database", the information record server 100*r* corresponds to a "transmission destination", and the intention confirmation record corresponds to a "change record".

Second Embodiment

Figure 13:
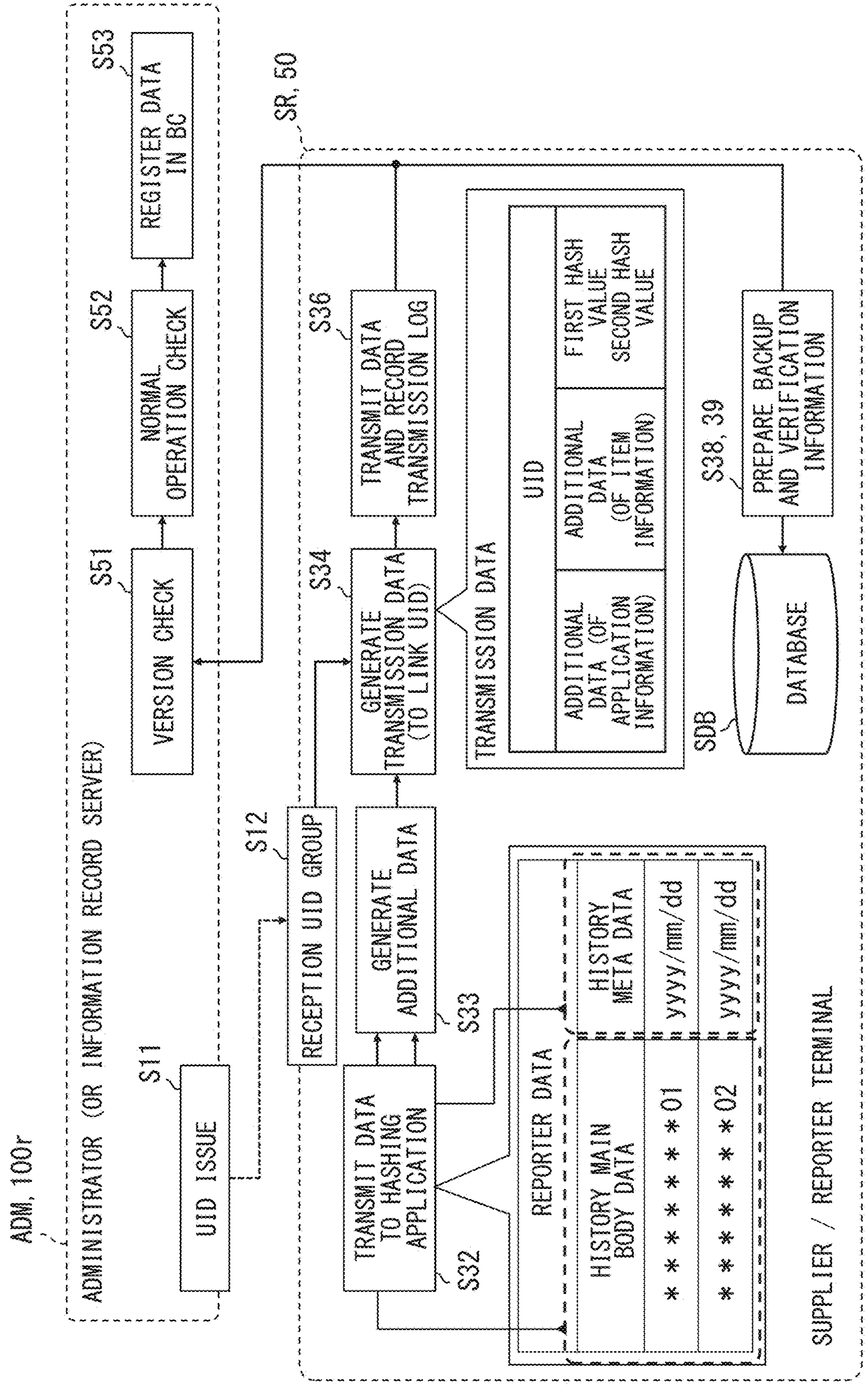
FIG. 13 is a diagram showing an overview of main processing performed in a second embodiment.

The reporter terminal 50 according to the second embodiment of the present disclosure shown in FIG. 13 is capable of detecting diversion of the history information TRI by the supplier SR. Hereinafter, the details of the operations of the data collection unit 61 and the data generation unit 64 in the reporter process of the second embodiment will be described based on FIG. 13 with reference to FIGS. 1, 2 and 4.

The data collection unit 61 prepares the reporter data including the history body data and the history metadata (see S31). The history body data is information recorded on the supplier SR side, and, similar to the reporter data in the first embodiment, the history body data includes product information, lot number information, and the history information TRI. The history body data is the detection target whether or not the history body data has been copied and diverted. The history metadata is information that is accompanied with the history body data. The history metadata includes, for example, information indicating the date and time when the history body data was generated or registered. The content of the history metadata changes depending on when the history metadata is generated.

The data generation unit 64 acquires the history body data and the history metadata from the data collection unit 61 as the reporter data. The data generation unit 64 calculates a first hash value prepared by hashing the pre-process data that does not include the history metadata, and a second hash value prepared by hashing the pre-process data that includes at least the history metadata.

Specifically, the data generation unit 64 transmits the history body data to the hashing application HAP (see S32 in FIGS. 4 and 13) and generates a first hash value. Furthermore, the data generation unit 64 transmits the history metadata to the hashing application HAP (see S32), and generates a second hash value. The data generation unit 64 may generate the second hash value by transmitting the pre-process data including both the history body data and the history metadata to the hashing application HAP.

The data generation unit 64 generates the transmission data by linking the first hash value, the second hash value, and the additional data to the item identification information UID acquired from the information reception unit 62 (see S34). As a result of the above, the transmission data including the first hash value and the second hash value is transmitted via the data logger 59 to the information record server 100*r*. Furthermore, a backup including the first hash value and the second hash value is stored in the reporter database SDB as the management data.

In the second embodiment described so far, the verification information is stored in the reporter database SDB together with the backup, so that the same effect as in the first embodiment is achieved, and it is possible to confirm that the backup has been falsified.

Additionally, in the second embodiment, the reporter data prepared by the data collection unit 61 includes the history body data recorded on the supplier SR side and the history metadata is accompanied with the history body data. Then, the data management unit 66 generates, as information to be included in the transmission data, a first hash value acquired by hashing the history body data using a hash function, and a second hash value acquired by hashing pre-process data including at least the history metadata using a hash function.

As described above, in a case where the history body data separated from the history metadata is hashed and a first hash value is generated, if the history body data is copied and diverted to another item IM, the first hash values associated with multiple pieces of the item identification information UIDs will be the same value. Therefore, by monitoring whether or not the first hash values are different from one another, it becomes possible to detect the unauthorized diversion of the history body data by a malicious supplier SR.

In addition, since the second hash value based on the history metadata is generated separately from the first hash value and stored in the BC database BDB and the reporter database SDB, it is also possible to verify the falsifying of the history metadata. The process of detecting data diversion may be performed by the information record server 100*r* that has acquired the transmission data, or may be performed by the data management unit 66 when storing the backup.

Other Embodiments

Although the multiple embodiments according to the present disclosure have been described above, the present disclosure is not construed as being limited to the above-described embodiments, and can be applied to various embodiments and combinations within a range not departing from the aspect of the present disclosure.

In the first embodiment, the process of combining the reporter data with the backup and hashing it may be omitted. For example, in the first modification of the above embodiment, only consecutive file numbers are assigned. On the other hand, in the second modification of the above embodiment, the assignment of a file number is omitted, and only the process of registering a hashed value of the backup in the verification data table is performed.

The feature of the item identification information UID in the above embodiment, specifically, the number of digits of the character string, the number and the type of information embedded in the item identification information UID, and the like may be changed as appropriate. Moreover, a one-dimensional code such as a barcode recording the item identification information UID may be printed on the attached label LB instead of the two-dimensional code CDq. Furthermore, the item identification information UID may be recorded as electronic data on a storage medium such as an RFID (i.e., radio frequency identifier) or a microchip attached to the item IM.

In a modification example in which the item identification information UID is recorded in an RFID or a microchip, a reader and a writer are connected to the reporter terminal 50 as a reading device and an output device. The reader reads out the item identification information UID recorded as the electronic data on the storage medium, and outputs it to the control circuit 50*c*. The writer writes the electronic data of the item identification information UID generated by the control circuit 50*c* to a storage medium.

Various hash functions may be used to generate the hash value HV in the above embodiment. The hash function has a characteristic that the same hash value is not output from different inputs, and it is substantially impossible to estimate an input from the output hash value. If such characteristics are present, encryption algorithms such as SHA-256, SHA-1, SHA-2, and SHA-3 can be used appropriately according to the required output length (i.e., the number of bits).

In the above embodiments, each function provided by the reporter terminal 50 and each of the servers 100*r*, 100*i* can be provided by software and hardware that executes the software, only software, only hardware, or a complex combination thereof. When these functions are provided by electronic circuits as hardware, each function can also be provided by digital circuits that include a large number of logic circuits, or by analog circuits.

Each processor in the above embodiments may include at least one arithmetic core such as a central processing unit (i.e., CPU) and a graphics processing unit (i.e., GPU). The processor may further include a field-programmable gate array (i.e., FPGA) and an IP core having other dedicated functions.

The feature of the storage medium (i.e., non-transitory tangible storage medium) employed as each memory unit of the above embodiment and storing each program related to the information management method of the present disclosure may be changed as appropriate. For example, the storage medium is not limited to a configuration provided on a circuit board, but may be provided in the form of a memory card or the like, inserted into a slot portion, and electrically connected to a bus of a computer. The storage medium may include an optical disk which forms a source of programs to be copied into a computer, a hard disk drive therefor, and the like.

The control unit and the method thereof described in the present disclosure may be implemented by a special purpose computer, which includes a processor programmed to execute one or more functions performed by computer programs. Alternatively, the device and the method thereof according to the present disclosure may be implemented by a dedicated hardware logic circuit. Alternatively, the device and the method thereof according to the present disclosure may be implemented by one or more dedicated computers implemented by a combination of a processor that executes a computer program and one or more hardware logic circuits. The computer program may also be stored on a computer-readable and non-transitory tangible storage medium as an instruction executed by a computer.

Embodiments of Technical Features

This specification discloses multiple technical features described in multiple items listed below. Some items may be written in a multiple dependent form, in which subsequent items alternatively refer to preceding items. Alternatively, some features may be described in a multiple dependent form referring to another multiple dependent form. These features described in a multiple dependent form define multiple technical features.

(Technical Feature 1)

An information management method for managing information collected by a reporter under a management of an administrator is implemented by at least one of (i) a circuit and (ii) a processor having a memory storing computer program code.

The at least one of the circuit and the processor having the memory is configured to execute the information management method for a process including:

- transmitting transmission data based on reporter data prepared by the reporter to a transmission destination in connection with the administrator;
- preparing a backup of the transmission data;
- preparing verification information to be used for verifying that the backup has not been falsified; and
- storing the backup together with the verification information in a database of the reporter.

(Technical Feature 2)

In the information management method according to technical feature 1, the preparing of the verification information includes: assigning consecutive management numbers to the backup stored in the database as the verification information.

(Technical Feature 3)

In the information management method according to technical feature 1 or 2, the preparing of the verification information includes: generating hashed data as the verification information by hashing the backup using a hash function.

(Technical feature 4)

In the information management method according to technical feature 1 or 2, the generating of the hashed data includes: combining the reporter data with the backup.

(Technical feature 5)

In the information management method according to technical feature 3 or 4, the process further includes: changing a content of the process of hashing the backup.

(Technical feature 6)

In the information management method according to any one of technical features 1 to 5, the process further includes: acquiring a transmission log that records that the transmission data having a same content as the backup data has been transmitted to the transmission destination.

The storing of the backup includes: storing the transmission log together with the backup in the database.

(Technical feature 7)

In the information management method according to any one of technical features 1 to 6, the reporter data includes history body data recorded on the reporter and history metadata accompanied with the history body data.

The process further includes: generating, as information to be included in the transmission data, a first hash value acquired by hashing the history body data using a hash function, and a second hash value acquired by hashing pre-process data including at least the history metadata using the hash function.

(Technical feature 8)

In the information management method according to any one of technical features 1 to 7, the process further includes: storing a change record that records a change in a content added to the backup in the database in connection with the backup when the change is added to the backup.

(Technical feature 9)

An information management device manages information acquired by a reporter under the management of an administrator. The information management device includes: at least one of (i) a circuit and (ii) a processor having a memory storing computer program code.

The at least one of the circuit and the processor having the memory is configured to cause the information management device to:

- transmits transmission data based on reporter data prepared by the reporter to a transmission destination in connection with the administrator;
- prepare a backup of the transmission data;
- prepare verification information to be used for verifying that the backup has not been falsified; and
- store the backup together with the verification information in a database of the reporter.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An information management method for managing information collected by a reporter terminal under a management of a traceability management system executed by a computer, the information management method comprising a process executed by at least one processor, wherein: the process includes:

- transmitting transmission data based on reporter data prepared by the reporter terminal to a transmission destination in connection with the traceability management system;
- preparing a backup of the transmission data;

preparing verification information to be used for verifying that the backup has not been falsified, wherein the preparing of the verification information includes generating hashed data, as the verification information, by hashing the backup using a hash function;

changing, based on a predetermined trigger, a content of a process for hashing the backup used to generate the hashed data, thereby avoiding a situation in which both the backup and the hashed data are falsified to make them consistent with each other; and storing the backup together with the verification information in a database of the reporter terminal, wherein a pattern identifier indicating a pattern of the process for hashing the backup is recorded in verification data stored in the database.

2. The information management method according to claim 1, wherein:

the preparing of the verification information includes assigning consecutive management numbers as the verification information to the backup to be stored in the database.

3. The information management method according to claim 1, wherein:

the generating of the hashed data includes: combining the reporter data with the backup.

4. The information management method according to claim 1, wherein:

the process further includes: acquiring a transmission log that records that the transmission data having a same content as the backup has been transmitted to the transmission destination; and the storing of the backup includes storing the transmission log in the database together with the backup.

5. The information management method according to claim 1, wherein:

the reporter data includes history body data recorded on the reporter terminal and history metadata accompanied with the history body data; and the process further includes generating, as information to be included in the transmission data, a first hash value acquired by hashing the history body data using a hash function, and a second hash value acquired by hashing pre-process data including at least the history metadata using the hash function.

6. The information management method according to claim 1, wherein:

the process further includes storing a change record that records a change in a content added to the backup in the database in connection with the backup when the change is added to the backup.

7. An information management device for managing information acquired by a reporter terminal under a management of a traceability management system, the information management device comprising:

a data transmission unit that transmits transmission data based on reporter data prepared by the reporter terminal to a transmission destination in connection with the traceability management system; and a data storage unit that prepares a backup of the transmission data, prepares verification information to be used for verifying that the backup has not been falsified, wherein the preparing of the verification information includes generating hashed data, as the verification information, by hashing the backup using a hash function, changes, based on a predetermined trigger, a content of a process for hashing the backup used to generate the hashed data, thereby avoiding a situation in which both the backup and the hashed data are falsified to make them consistent with each other, and stores the backup together with the verification information in a database of the reporter terminal, wherein a pattern identifier indicating a pattern of the process for hashing the backup is recorded in verification data stored in the database, and wherein the information management device further comprises at least one of (i) a circuit and (ii) a processor having a memory storing computer program code, wherein the at least one of (i) the circuit and (ii) the processor having the memory is configured to cause the information management device to provide at least one of: the data transmission unit; and the data storage unit.

8. The information management method according to claim 1, wherein:

the changing of the content of the process for hashing the backup includes changing the content of the process for hashing to at least one of a method of dividing hashed values, an arrangement of divided values, or a method of hashing arranged values.

* * * * *